US007017296B2

(12) United States Patent
Templeman et al.

(10) Patent No.: US 7,017,296 B2
(45) Date of Patent: Mar. 28, 2006

(54) AUTOMATIC HOOK SETTING, FISHING ROD HOLDER

(75) Inventors: Steven Wesley Templeman, Joplin, MO (US); Scott Wesley Templeman, Carthage, MO (US)

(73) Assignee: Evergreen Outdoors, Inc., Joplin, MO (US)

( * ) Notice: Subject to any disclaimer, the term of this patent is extended or adjusted under 35 U.S.C. 154(b) by 117 days.

(21) Appl. No.: 10/307,901

(22) Filed: Dec. 2, 2002

(65) Prior Publication Data

US 2003/0159325 A1 Aug. 28, 2003

Related U.S. Application Data

(63) Continuation-in-part of application No. 29/156,082, filed on Feb. 22, 2002, now abandoned.

(51) Int. Cl.
*A01K 97/11* (2006.01)

(52) U.S. Cl. .......................................................... 43/15
(58) Field of Classification Search ..................... 43/15, 43/16, 21.2
See application file for complete search history.

(56) References Cited

U.S. PATENT DOCUMENTS

| | | | | | |
|---|---|---|---|---|---|
| 716,726 | A | | 12/1902 | Leib | |
| 796,948 | A | | 8/1905 | Tuttle | |
| 876,732 | A | | 1/1908 | Schmidt | |
| 916,891 | A | | 3/1909 | Schildback | |
| 1,045,177 | A | | 11/1912 | Pluschke | |
| 1,549,405 | A | | 8/1925 | Bjurstrom | |
| 1,957,853 | A | | 5/1934 | Sibley | |
| 1,996,704 | A | | 4/1935 | Hawkinson | |
| 2,008,482 | A | | 7/1935 | Wolf | |
| 2,204,560 | A | | 6/1940 | Allison | |
| 2,295,250 | A | | 9/1942 | Zenewich | |
| 2,618,090 | A | * | 11/1952 | Kimura | 43/15 |
| 2,640,290 | A | | 6/1953 | Ames et al. | |
| 2,661,563 | A | * | 12/1953 | Adams, Jr. et al. | 43/16 |
| 2,703,465 | A | * | 3/1955 | Di Stefano | 43/15 |
| 2,784,516 | A | | 3/1957 | Barnes | |
| 2,784,517 | A | | 3/1957 | Mooney | |
| 2,811,801 | A | | 11/1957 | Daniel | |
| 2,898,697 | A | | 8/1959 | Housman | |
| 2,906,049 | A | * | 9/1959 | Shirk | 43/15 |
| 2,921,398 | A | * | 1/1960 | Cunningham | 43/15 |
| 2,934,847 | A | * | 5/1960 | Duff | 43/15 |
| 2,996,824 | A | * | 8/1961 | Faycosh | 43/16 |
| 3,016,648 | A | * | 1/1962 | Ingersoll et al. | 43/15 |
| 3,055,136 | A | * | 9/1962 | Scott et al. | 43/15 |
| 3,205,606 | A | | 9/1965 | Banta | |
| 3,270,457 | A | | 9/1966 | Austin | |

(Continued)

FOREIGN PATENT DOCUMENTS

| | | | | |
|---|---|---|---|---|
| FR | 2719745 | B1 | * | 11/1995 |
| FR | 2723513 | B1 | * | 2/1996 |
| WO | WO-03/024209 | B1 | * | 3/2003 |

OTHER PUBLICATIONS

Undated Advertisement entitled "Tackling New Topics," *Insider*, date unknown.

Undated Advertisement entitled "The Fisherman's Amazing Automatic Hookset & Rod Holder," date unknown.

*Primary Examiner*—Darren W. Ark
(74) *Attorney, Agent, or Firm*—McAfee & Taft

(57) ABSTRACT

The current invention provides an improved an automatic hook setting, fishing rod holder. The automatic hook setting, fishing rod holder includes means for adjusting the sensitivity of the device and includes safety devices to protect the user from injuries resulting from inadvertent triggering of the device. The automatic hook setting, fishing rod of the current invention is designed for use in virtually any location.

5 Claims, 5 Drawing Sheets

U.S. PATENT DOCUMENTS

| | | | | | |
|---|---|---|---|---|---|
| 3,271,891 | A | * | 9/1966 | Hancock | 43/15 |
| 3,412,499 | A | | 11/1968 | Pastrovich | |
| 3,451,155 | A | | 6/1969 | Huliew | |
| 3,660,921 | A | * | 5/1972 | McDonnell | 43/15 |
| 3,750,320 | A | * | 8/1973 | Benedetti | 43/15 |
| 3,837,109 | A | | 9/1974 | De Julio | |
| 3,881,269 | A | * | 5/1975 | Timmons | 43/15 |
| 3,897,646 | A | | 8/1975 | Sheets | |
| 3,914,894 | A | | 10/1975 | Kobza | |
| 3,973,346 | A | | 8/1976 | Mason | |
| 4,031,651 | A | | 6/1977 | Titze | |
| 4,040,197 | A | | 8/1977 | Robbins | 43/15 |
| 4,159,589 | A | | 7/1979 | Pendegraft | |
| 4,188,742 | A | * | 2/1980 | Oulman | 43/15 |
| 4,235,035 | A | | 11/1980 | Guthrie | 43/15 |
| 4,321,767 | A | | 3/1982 | Hodshire | 43/15 |
| 4,344,248 | A | | 8/1982 | Brophy, Sr. et al. | 43/15 |
| 4,391,059 | A | | 7/1983 | Cardova | |
| 4,393,615 | A | | 7/1983 | Hodshire | 43/15 |
| 4,476,645 | A | | 10/1984 | Paarmann | |
| 4,550,519 | A | * | 11/1985 | Simmons et al. | 43/15 |
| 4,641,453 | A | * | 2/1987 | Roberts, Sr. | 43/21.2 |
| 4,676,018 | A | | 6/1987 | Kimball | |
| 4,677,783 | A | * | 7/1987 | Cratsa | 43/15 |
| 4,823,493 | A | * | 4/1989 | Gray | 43/15 |
| 4,920,681 | A | | 5/1990 | Toliver | |
| 4,924,617 | A | | 5/1990 | Parent | 43/15 |
| 4,941,278 | A | | 7/1990 | Verkuil | 43/15 |
| 5,050,332 | A | | 9/1991 | Cross | |
| 5,076,001 | A | | 12/1991 | Coon | |
| 5,245,778 | A | | 9/1993 | Gallegos | |
| 5,274,943 | A | | 1/1994 | Ratcliffe et al. | 43/17 |
| 5,363,582 | A | | 11/1994 | Walker et al. | 43/15 |
| 5,383,298 | A | | 1/1995 | Engel | |
| 5,483,768 | A | | 1/1996 | Tessier | 43/16 |
| 5,499,469 | A | | 3/1996 | Guillemette | 43/16 |
| 5,524,376 | A | | 6/1996 | Flisak | |
| 5,542,205 | A | | 8/1996 | Updike | 43/15 |
| 5,873,191 | A | | 2/1999 | Bova et al. | 43/15 |
| 5,903,998 | A | | 5/1999 | Hawkins et al. | 43/15 |
| 5,930,938 | A | | 8/1999 | De Fraties et al. | 43/15 |
| 5,992,080 | A | | 11/1999 | Allen | |
| 6,094,851 | A | * | 8/2000 | Guidry | 43/15 |
| 6,571,507 | B1 | * | 6/2003 | Elford | 43/21.2 |

* cited by examiner

AUTOMATIC HOOK SETTING, FISHING ROD HOLDER

This application is a continuation-in-part application of Ser. No. 29/156,082 filed Feb. 22, 2002 now abandoned.

BACKGROUND OF THE INVENTION

The current invention relates to a device for holding a fishing rod capable of automatically setting a hook. The current invention may be mounted in virtually any location including but not limited to docks, boats and shore side banks. The device is adjustable to accommodate the strikes of various types of fish.

The fishing equipment field contains several variations on fishing pole holders. Some of these devices have attempted to provide a pole holder capable of setting the hook in response to a strike by a fish. However, many of these devices are lacking in one aspect or another. Some of the devices do not provide a means for adjusting the sensitivity of the trigger for setting the hook. Other pole holding devices have pinch points which stress the fishing pole in a detrimental manner. Further, the foregoing devices lack safeties for precluding the accidental activation of the device during handling.

The device of the current invention overcomes the drawbacks of the prior art devices by providing a simple automatic hook setting, rod holder. The automatic hook setting, rod holder of the current invention incorporates a safety to protect against the accidental activation of the trigger mechanism. As a further benefit, the automatic hook setting rod holder provides an easily adjustable trigger assembly.

SUMMARY OF THE INVENTION

In one embodiment, the current invention provides an automatic hook setting, fishing rod holder suitable for use in virtually any fishing environment. The device of the current invention comprises a support base, a rod holder portion pivotably mounted to the support base and a tension spring connecting the rod holder portion to the base. The base also supports a trigger arm assembly comprising a trigger hinge and a trigger sear. When latched, the trigger sear engages a receiver carried by the rod holder.

In another embodiment of the current invention, the automatic hook setting, fishing rod holder comprises a support base, a rod holder portion pivotably mounted to the support base and a tension spring connecting the rod holder portion to the base. The base also supports a trigger arm assembly comprising a trigger hinge and a trigger sear. When latched, the trigger sear engages a receiver carried by the rod holder. Additionally, the automatic hook setting, fishing rod holder carries a safety designed to prevent the accidental release of the trigger assembly from the latched position. Typically, the rod holder portion carries the safety.

In yet another embodiment, the current invention comprises a support base, a rod holder portion pivotably mounted to the support base and a tension spring connecting the rod holder portion to the base. The base also supports a trigger arm assembly comprising a trigger hinge and a trigger sear. When latched, the trigger sear engages a receiver carried by the rod holder. The trigger sear receiver further comprises a means for adjusting the sensitivity of the trigger arm assembly. Typically, the means for adjusting the sensitivity comprises threads located within the trigger sear receiver and a threaded rod positioned within the trigger receiver. Adjustment of the threaded rod determines the penetration of the trigger sear into the trigger sear receiver.

Still further, the current invention provides an automatic hook setting, rod holder comprising a support base, a rod holder portion pivotably mounted to the support base and a tension spring connecting the rod holder portion to the base. The base also supports a trigger arm assembly comprising a trigger hinge and a trigger sear. When latched, the trigger sear engages a receiver carried by the rod holder. The trigger sear receiver further comprises a means for adjusting the sensitivity of the trigger arm assembly. Typically, the means for adjusting the sensitivity comprises threads located within the trigger sear receiver and a threaded rod positioned within the trigger receiver. Adjustment of the threaded rod determines the penetration of the trigger sear into the trigger sear receiver. To prevent accidental activation, the automatic hook setting, fishing rod holder also includes a safety.

DETAILED DESCRIPTION OF THE CURRENT INVENTION

Figure 1:
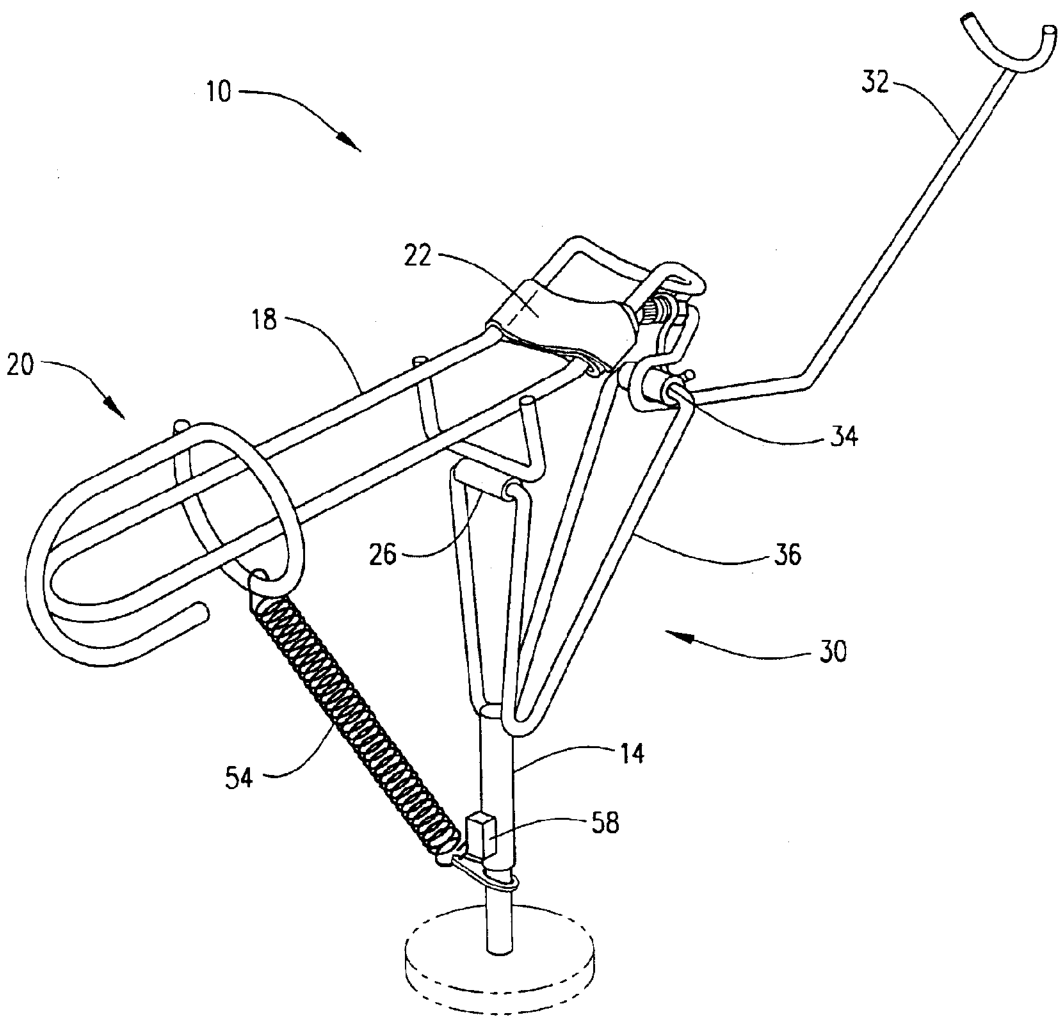
FIG. 1 is a perspective view of the current invention.

The current invention will be described with reference to the drawings. As depicted in FIG. 1, device 10 represents a preferred embodiment of the automatic hook setting, fishing rod holder of the current invention. Device 10 comprises a base 14 supporting a rod holder 18 and a trigger arm assembly 30. Base 14 may be mounted to any convenient means for securing device 10. For example, base 14 may be finished with threads (not shown) suitable for mounting to a threaded receiver on a boat. Alternatively, base 14 may terminate in a sharp point suitable for driving into the grounds or otherwise be attached to a stake driven into the ground. Thus, device 10 is readily adaptable to several different mounting means. Accordingly, the current invention is not limited to any one mounting configuration.

Figure 4:
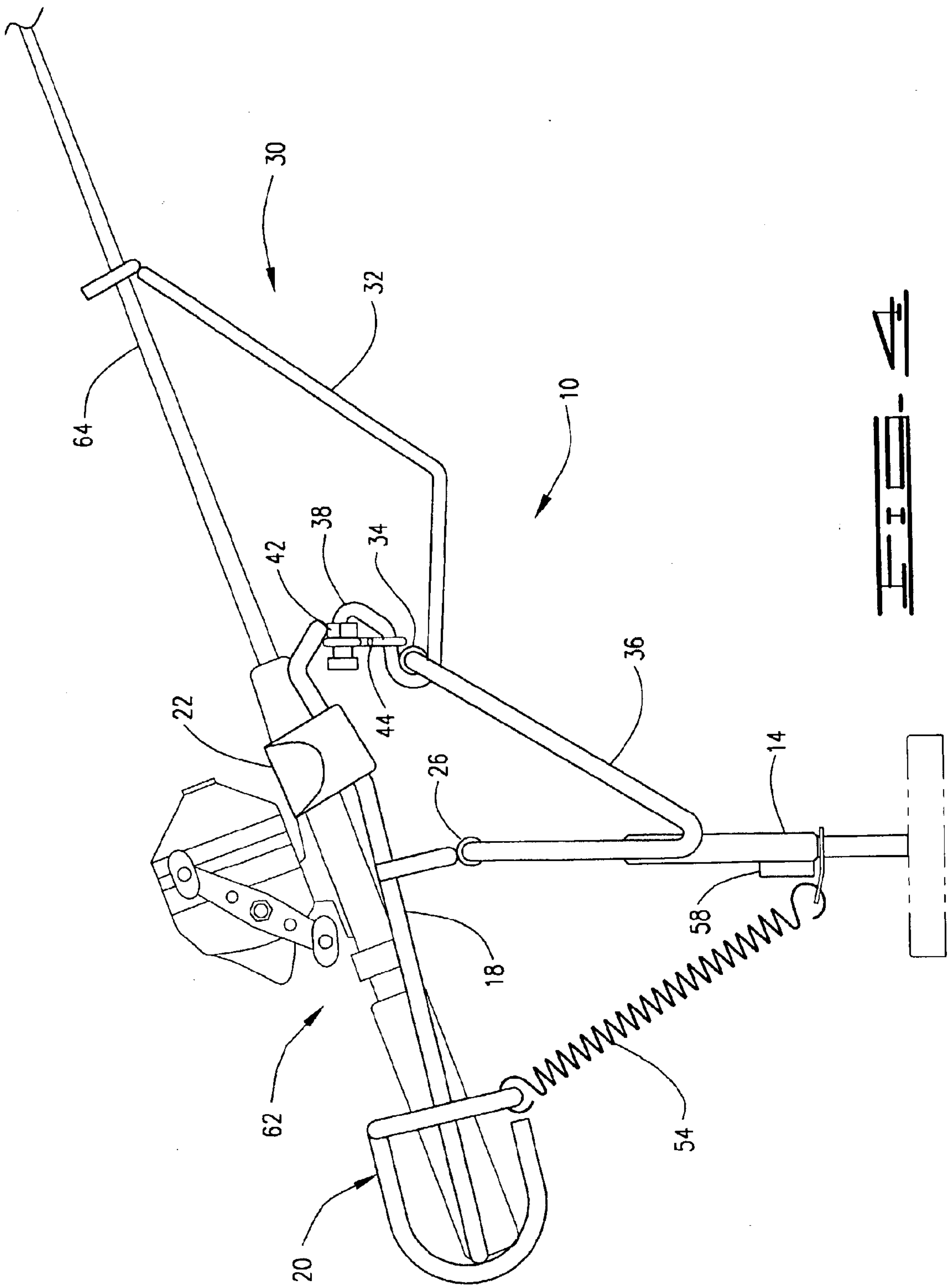
FIG. 4 is a perspective view showing a fishing rod held by the current invention with the invention in the latched position.
Figure 5:
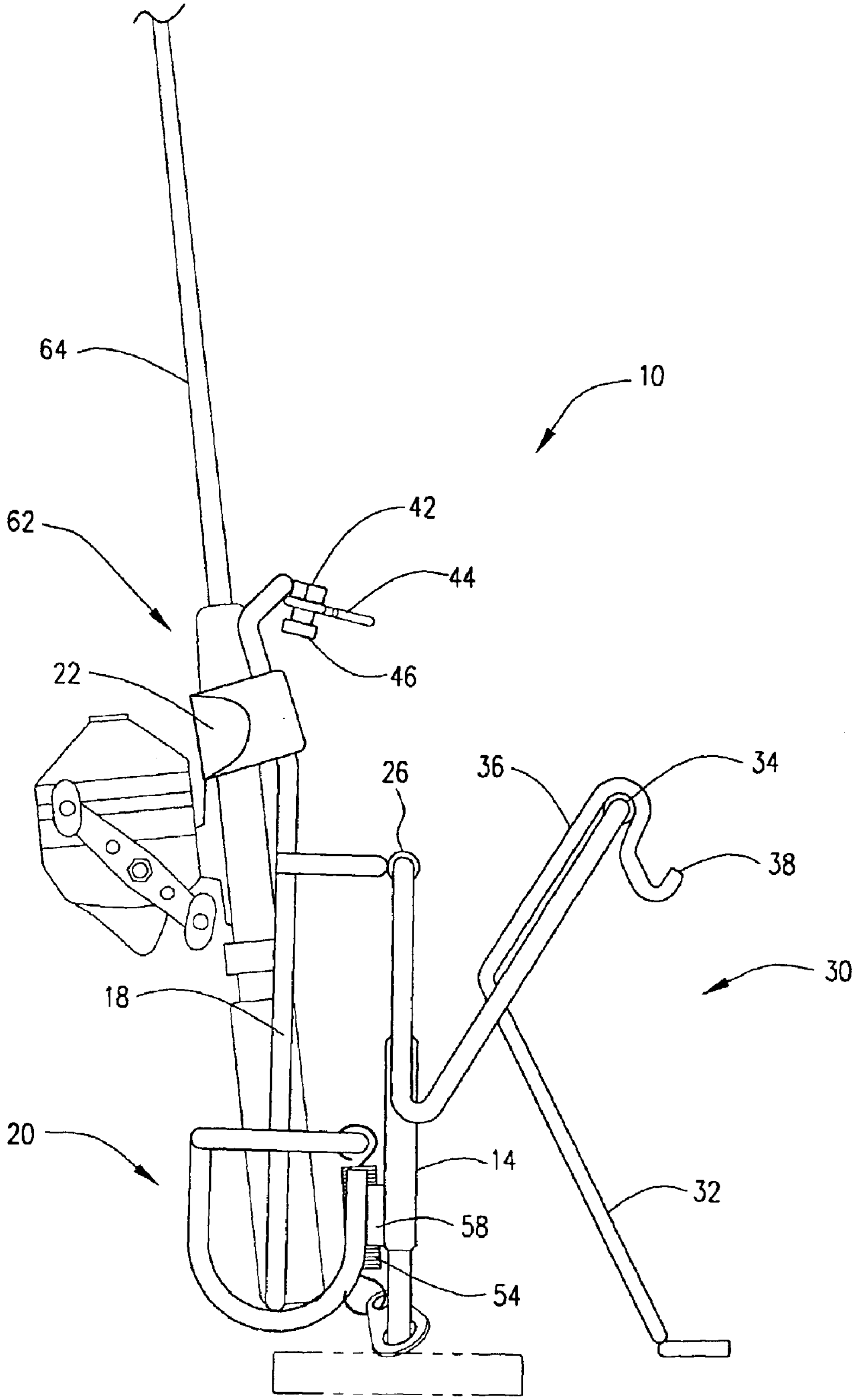
FIG. 5 is a perspective view showing a fishing rod held by the current invention with the invention in the unlatched position.

A pivot hinge 26 secures rod holder 18 to base 14. Additionally, a tensioning spring 54 attaches to rod holder 18 and base 14 in any conventional manner. Preferably, rod holder 18 includes a tubular portion 20. Tubular portion 20 is designed to receive the handle of a fishing rod 62 as depicted in FIGS. 4 and 5. Although depicted as rod like projections, tubular portion 20 can be formed in any convenient manner capable of receiving the handle of any type of fishing rod 62. For example, a short section of pipe (not shown) mounted to rod holder 18 will also suffice as tubular portion 20.

Base 14 additionally supports a trigger assembly 30. Trigger assembly 30 comprises a trigger arm support 36, trigger hinge 34 and trigger arm 32. As shown, trigger arm 32 is pivotably mounted on trigger arm support 36 at trigger hinge 34. Trigger arm 32 carries a trigger sear 38. Trigger sear 38 engages a sear receiver 42 carried by rod holder 18.

Figure 2:
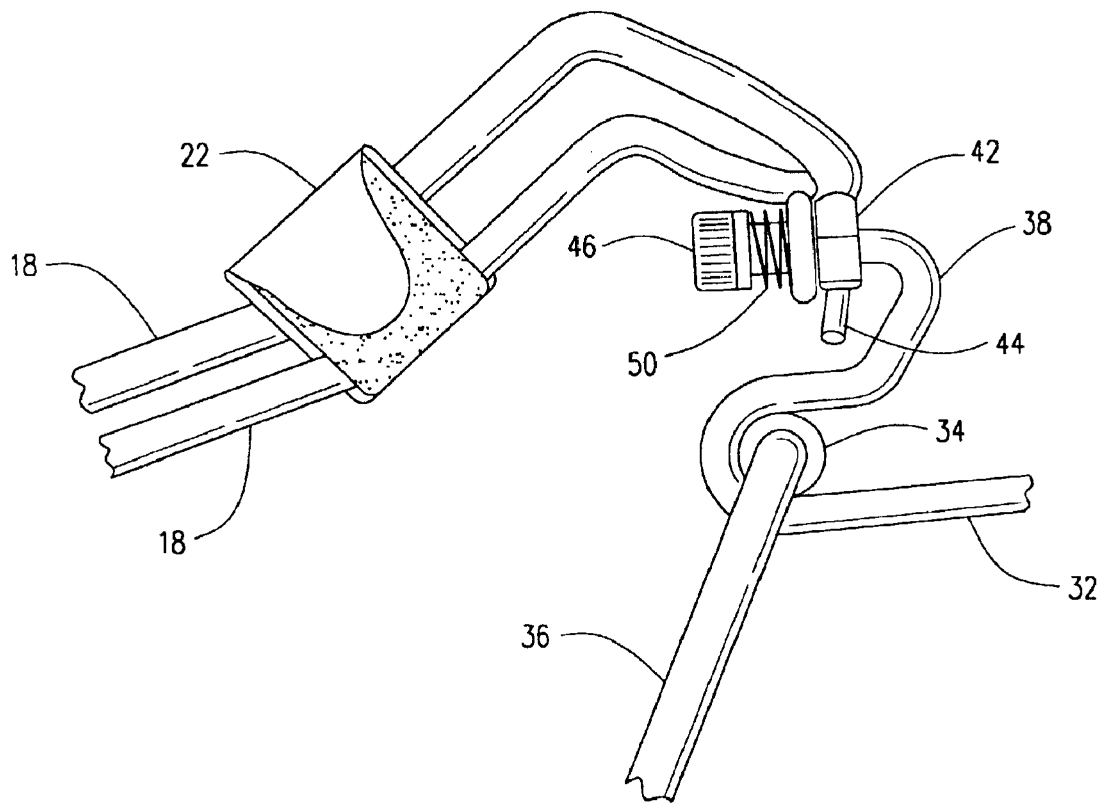
FIG. 2 is a detailed view depicting the trigger sear and safety strap.
Figure 3:
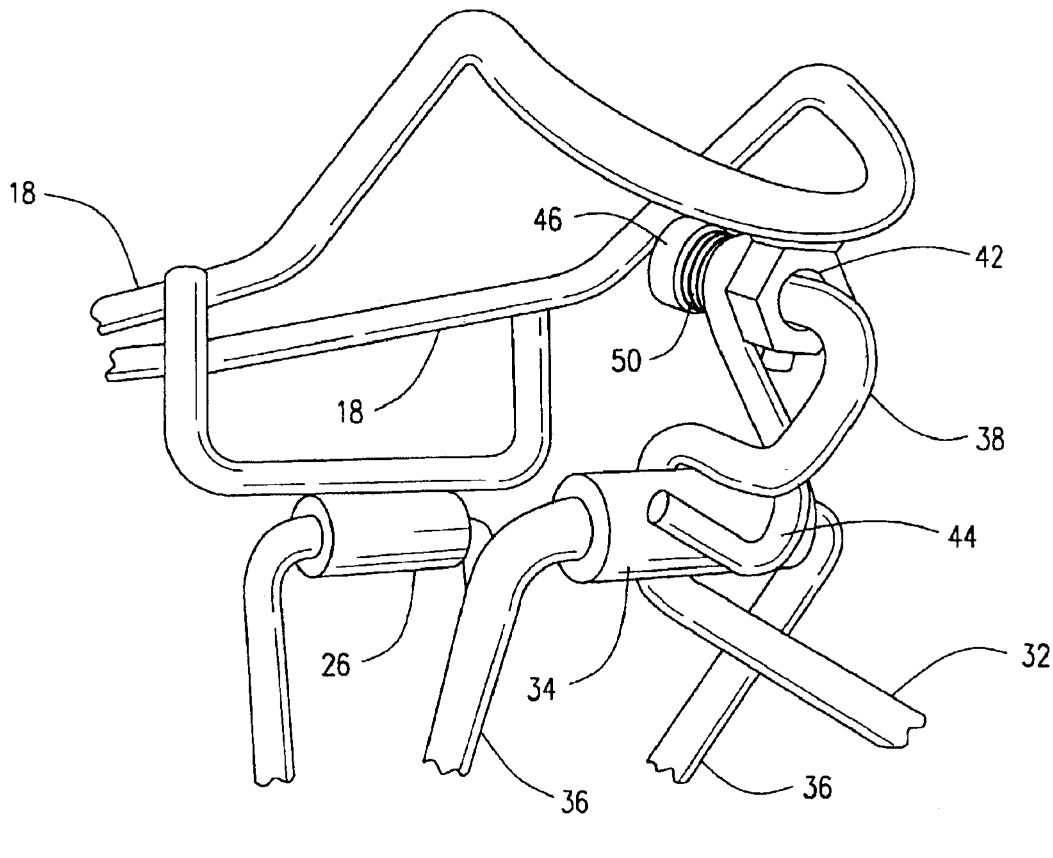
FIG. 3 is a detailed view depicting the safety, the trigger sear out and the trigger sear receiver.

As shown in FIGS. 2 and 3, trigger sear 38 is a projection capable of latching trigger arm 32 to rod holder 18 when inserted into sear receiver 42. Sear receiver 42 is conveniently a round opening sized to receive trigger sear 38. However, any suitable flange or ridge carried by rod holder 18 and engagable by trigger sear 38 will suffice. Preferably, as shown in FIGS. 2 and 3, sear receiver 42 has a round, threaded opening. Disposed within sear receiver 42 is a threaded rod 46. Threaded rod 46 may be a screw, bolt or other such component suitably threaded to fit within sear receiver 42. A preferred threaded rod 46 for use in the current invention is a thumbscrew. Adjustment of threaded rod 46 within sear receiver 42 determines the degree of force necessary to dislodge trigger sear 38 from sear receiver 42. Thus, threaded rod 46 provides the means for adjusting the sensitivity of device 10. Preferably, a spring 50 is mounted and retained around threaded rod 46. Spring 50 applies frictional resistance to threaded rod 46 such that once the sensitivity of device 10 has been set, manual force will be required to alter the sensitivity. Thus, wave motion or vibrations will not alter the sensitivity of device 10. Other configurations designed to limit the depth of trigger sear 38 on or in sear receiver 42 will also perform satisfactorily as sensitivity adjustment devices.

As depicted in FIGS. 2 and 3, a preferred embodiment of the current invention includes a safety 44 and a fishing rod retaining strap 22. Both of these devices enhance the safety of device 10. Safety 44 is preferably carried by threaded rod 46. Alternatively, rod holder 18 may carry safety 44. The precise location of safety 44 is not critical so long as safety 44 is positioned in a manner to engage either trigger sear 38 or trigger arm 32 in a manner to preclude the accidentally release of rod holder 18 from trigger assembly 30. As shown in FIG. 3, safety 44 engages trigger sear 38.

Fishing rod retaining strap 22 also enhances user safety by ensuring the stability of fishing rod 62 within device 10. As will be described in greater detail below, the release of trigger arm 32 produces a rapid movement of rod holder arm 18 to approximately the vertical position. The rapid movement of rod holder 18 may propel fishing rod 62 out of device 10. However, when wrapped around fishing rod 62, strap 22 provides the means for retaining fishing rod 62 within device 10. While shown as strap 22, the substitution of other devices such as springs or rigid rods will suffice to retain fishing rod 62 in device 10. However, retaining strap 22 is preferred as it permits the quick release of fishing rod 62 from device 10. Thus, retaining strap 22 preferably utilizes a conventional hook and loop area (not shown), known as VELCRO®, to retain fishing rod 62 in device 10.

Device 10 may also include a shock-absorbing device 58 mounted on base 14. As noted above, rod holder 18 will move rapidly when released by trigger assembly 30. Depending on the strength of tensioning spring 54, this rapid movement may damage base 14 when rod holder 18 to collides with base 14. Accordingly, shock-absorber 58 is positioned in a manner to preclude rod holder 18 from colliding with base 14. Shock-absorber 58 may be a spring, a piece of rubber or other suitable material capable of precluding contact between base 14 and rod holder 18 without damaging either component.

The following description of the use of device 10 will aid in the understanding of the current invention. As shown in FIG. 4, a user places fishing rod 62 in device 10 in the manner shown. Prior to latching device 10, the user should secure fishing rod 62 in rod holder 18 by wrapping strap 22 around fishing rod 62. Prior to latching, the user will preferably set the sensitivity of device 10 to a strike on the hook (not shown) by adjusting threaded rod 46. If the user adjusts threaded rod 46 with device 10 latched, then safety

44 should be positioned as shown in FIG. 3 to prevent the accidental complete release of trigger arm 32. Once the user has secured fishing rod 62 in rod holder 18, device 10 is latched in the "fishing position" by placing trigger sear 38 in sear receiver 42. Following positioning in the manner shown in FIG. 4, the user can swing safety 44 away to permit triggering of device 10. The user can then leave fishing rod 62 and device 10 unattended.

Any strike on the hook will deflect the pole portion 64 of fishing rod 62 downward against trigger arm 32. Sufficient pressure on trigger arm 32 by pole portion 64 triggers device 10 by forcing trigger sear 38 out of sear receiver 42 thereby allowing tension spring 54 to contract. The rapid contraction of tension spring 54 swings rod holder 18 and fishing rod 62 to an upright position as shown in FIG. 5. The rapid rotational movement of fishing rod 62 automatically sets the hook in the mouth of the fish. If the user is not in the vicinity of device 10, tension spring 54 also provides sufficient flexibility to allow device 10 to "play" the fish until the user returns.

Thus, the current invention provides an improved an automatic hook setting, fishing rod holder. The automatic hook setting, fishing rod holder of the current invention provides enhanced safety to the user and improves the likelihood of a successful fishing trip.

Other embodiments of the present invention will be apparent to those skilled in the art from a consideration of the accompanying drawings and this specification. It is intended that the specification be considered as only exemplary, with the true scope and spirit of the invention being indicated by the following claims.

We claim:

1. An automatic hook setting device comprising:

a support base;

a rod holder pivotably mounted to said support base;

a tension spring connected to said rod holder and to said base;

a trigger arm assembly comprising a trigger hinge, a trigger arm pivotable on said trigger hinge and a trigger sear carried by said trigger arm, said trigger arm assembly carried by said support base;

a means for adjusting the sensitivity of the trigger arm assembly wherein said means for adjusting the sensitivity of the trigger arm assembly comprises threads carried within a trigger sear receiver carried by said rod holder and a threaded rod positioned within at least a portion of said trigger sear receiver; and a safety carried by said threaded rod, said safety is positionable to engage said trigger sear thereby precluding the accidental activation of said automatic hook setting device.

2. The automatic hook setting, device of claim 1, wherein said threaded rod is a thumbscrew.

3. The automatic hook setting, device of claim 1, further comprising a spring carried by said threaded rod.

4. The automatic hook setting, device of claim 1, further comprising a fishing rod retaining strap carried by said rod holder.

5. The automatic hook setting, device of claim 1, further comprising a shock-absorber carried by said base in a position to engage said rod holder following release of said trigger arm assembly.

* * * * *